(12) United States Patent
Tsukamoto

(10) Patent No.: US 7,042,824 B2
(45) Date of Patent: *May 9, 2006

(54) OPTICAL MULTI-LEVEL RECORDING MEDIUM AND OPTICAL MULTI-LEVEL RECORDING METHOD

(75) Inventor: Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 438 days.

This patent is subject to a terminal disclaimer.

(21) Appl. No.: 09/972,950

(22) Filed: Oct. 10, 2001

(65) Prior Publication Data

US 2002/0041555 A1 Apr. 11, 2002

(30) Foreign Application Priority Data

Oct. 10, 2000 (JP) .............................. 2000-309332

(51) Int. Cl.
  *G11B 7/00* (2006.01)
(52) U.S. Cl. ............................... 369/59.22; 369/59.11; 369/124.02
(58) Field of Classification Search ............. 369/59.11, 369/59.22, 124.02
  See application file for complete search history.

(56) References Cited

U.S. PATENT DOCUMENTS 6,370,097 B1 * 4/2002 Hayashi et al. .......... 369/59.11
6,611,484 B1 * 8/2003 Tsukamoto .............. 369/59.11

FOREIGN PATENT DOCUMENTS

EP    1235210 A1 *  8/2002
JP    2001184648 A *  7/2001

* cited by examiner

*Primary Examiner*—Gautam R. Patel
(74) *Attorney, Agent, or Firm*—Oliff & Berridge, PLC

(57) ABSTRACT

An optical multi-level recording medium, having a recording layer on which a recording mark is formed by irradiating a laser beam, plural virtual recording cells being continuosly formed in a relative moving direction to the laser beam on the recording layer with an arbitrary unit length and a unit width, five stages or more irradiation times being set so that the irradiation time becomes long successively from the first to final stages, a power average value of laser beam in a specific irradiation time of the plural-stage irradiation times being set so as to become larger than a power average value of another irradiation time longer than the specific irradiation time, and recording marks being formed in the virtual recording cell and giving five stages or more different optical reflectance when the laser beam is irradiated to the virtual recording cell.

14 Claims, 9 Drawing Sheets

OPTICAL MULTI-LEVEL RECORDING MEDIUM AND OPTICAL MULTI-LEVEL RECORDING METHOD

BACKGROUND OF THE INVENTION

1. Field of the Invention

The present invention relates to an optical recording medium and method, which records information by irradiating a laser beam to a recording layer so as to form a recording mark, and in particular, to a technology of forming a plurality of recording marks having different state so as to record a data at a multi-level.

2. Description of the Related Art

In a conventional optical recording medium, a method has been employed such that a data is recorded by changing a length of read signal (i.e., a length of reflection signal modulation section). On the contrary, the following method has been frequently studied, more specifically, a plurality of data is recorded to each signal having the same length by changing a depth of the read signal (i.e., a modulation degree of reflection signal) at multiple stages.

According to the above optical recording method, as compared with the case where a binary data is merely recorded by the presence of pit, a plurality of data is recorded in a depth direction, so that a signal quantity allocated to a constant length can be increased; therefore, it is possible to improve a track recording density. In general, it is well known to change a power of laser beam at multiple stages, as the method of a depth of read signal at multiple stages. Recently, holograph has been used as the recording medium, and a recording medium having a multiple recording layer has been proposed.

In this case, it is called as multi-level recording to record each data so that a modulation degree of reflection signal is variable at multiple stages.

In the above multi-level recording, a laser beam is irradiated at multiple-stage power in recording; for this reason, in particular, when the power of laser beam gradually becomes large, a problem has arisen such that a signal quality is worsened in reading. Although the above cause has not been proved, the present inventors presume the cause as follows; more specifically, the laser power increases, and thereby, a recording mark area increases.

For example, in order to achieve a high density of the recording information of recording medium, in the case where multi-level recording is carried out in a manner of making small a recording mark, and changing a laser power at multiple stages, a signal quality has remarkably worsened in the recording mark recorded by large laser power.

Namely, if the multi-level recording method is employed using power change, a distance (interval) between the recording marks is made wide, and data detection must be securely made to some degree even if the signal quality has worsened.

Moreover, the conventional concept of achieving the multi-level recording by stepwise changing the laser power is based on the following premise that the recording mark length is at least larger than a radius of focused beam (beam waist) in recording. In general, a diameter of the focused beam is expressed as $K\lambda/NA$ (K: constant, $\lambda$: laser wavelength, NA: numerical aperture of lens. For example, in a pickup used for a CD, the laser wavelength $\lambda$ is 780 nm, the numerical aperture NA is 0.50, and the diameter of focused beam is about 0.8 µm. Thus, when the recording mark length is made small up to the vicinity of about 0.8 µm, the above problem of signal deterioration has remarkably arisen. In fact, it is very difficult to achieve five-stage or more multi-level recording by the method of changing a laser power.

On the contrary, although it is unknown when this application has been filed, an optical recording method has been disclosed in Japanese Patent application No. 2000-187568 filed by the same applicant as this application. More specifically, according to the above optical recording method, in place of the power of laser beam, an irradiation time to a predetermined virtual recording cell area is changed at multiple stages. By doing so, a recording mark (low optical reflectance area) having different size is formed in the entire virtual recording cell and brings different optical reflectance to the virtual recording cell; therefore, at least five-stage multi-level recording is possible.

The above optical recording method is a concept quite different from the conventional laser beam irradiation, and a recording mark may be formed by a short-time irradiation. Therefore, the case is sufficiently considered such that a recording mark smaller than a beam spot diameter is formed. In other words, multi-stage (five stages or more) and high density multi-level recording can be realized by effectively using an area in which the recording mark has been conventionally considered as being incomplete.

SUMMARY OF THE INVENTION

The present invention has been made in order to further study the above technology. Accordingly, an object of the present invention is to provide an optical recording medium, which can achieve multi-stage (multi-level) and high read-accuracy multi-level recording by setting a power of laser beam to a predetermined range.

The present inventors have earnestly studied optical recording medium and method; as a result, they have confirmed that it is possible to carry out multi-stage and stable high density multi-level recording.

(1) In order to achieve the above object, according to one aspect, the present invention provides an optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, five stages or more irradiation times being set with respect to the virtual recording cell so that the irradiation time becomes long successively from the first to final stages, a power average value of laser beam in a specific irradiation time of the plural-stage irradiation times being set so as to become larger than a power average value of another irradiation time longer than the specific irradiation time, and recording marks being formed in the virtual recording cell and giving five stages or more different optical reflectance to the virtual recording cell when the laser beam is irradiated to the virtual recording cell.

(2) Further, the present invention provides the optical recording medium, wherein in the plural irradiation times from the first stage to at least second stage, a power average value of laser beam of each stage is set so as to become longer than a power average value of another irradiation time longer than the plural irradiation times.

(3) Further, the present invention provides the optical recording medium, wherein in at least first stage irradiation time, the power of laser beam is set larger than a reference power until the midway time point from the irradiation start time point, and is set to the reference power until the termination time from the midway time point, and in another irradiation time longer than the irradiation time, the power of laser beam is set to the reference power until the termination time from the irradiation start time point.

(4) Further, the present invention provides the optical recording medium, wherein in at least first stage irradiation time, the power of laser beam is set larger than a reference power until the termination time point from the irradiation start time point, and in another irradiation time longer than the irradiation time, the power of laser beam is set to the reference power until the termination time from the irradiation start time point.

(5) Further, the present invention provides an optical recording medium, including a reflective layer and a recording layer, and constructed in a manner that a recording mark is formed on the recording layer by irradiating a laser beam so as to record information, the recording layer being continuously formed in a relative moving direction to the laser beam with plural virtual recording cells, each of which has an arbitrary unit length and a unit width perpendicular to the unit length in the relative moving direction, five stages or more irradiation times being set with respect to the virtual recording cell so that the irradiation time becomes long successively from the first to final stages, a reference time shorter than the final stage irradiation being set, the laser beam being irradiated in all range at a power larger than a reference power in an irradiation time shorter than the reference time of the plural stage irradiation times, and being irradiated at a power larger than a reference power in an irradiation time longer than the reference time until the reference time elapsed from the irradiation start time point, and further, being irradiated at the reference power after the reference time elapsed, when the laser beam irradiation time is short, the irradiation time at the reference power after the reference time elapsed decreasing so that a ratio of the irradiation time at the larger power increases, and thereby, a power average value of the laser beam becoming large so that recording mark having five stages or more different optical reflectance.

(6) Further, the present invention provides the optical recording medium, wherein the recording layer contains an organic dye.

(7) Moreover, in order to achieve the above object, according to another aspect, the present invention provides an optical recording method, which irradiates an laser beam to an optical recording medium including a reflective layer and a recording layer, and forms a recording mark is formed on the recording layer so as to record information, comprising the following stages of:

continuously forming plural virtual recording cells, each of which has an arbitrary unit length and a unit width perpendicular to the unit length in a relative moving direction to the laser beam, in the relative moving direction, with respect to the recording layer;

setting five stages or more irradiation times with respect to the virtual recording cell so that the irradiation time becomes long successively from the first to final stages;

setting a power average value of laser beam in a specific irradiation time of the plural-stage irradiation times so as to become larger than a power average value of another irradiation time longer than the specific irradiation time; and forming recording marks being formed in the virtual recording cell and giving five stages or more different optical reflectance to the virtual recording cell when the laser beam is irradiated to the virtual recording cell.

(8) Further, the present invention provides the optical recording method, wherein in the plural irradiation times from the first stage to at least second stage, a power average value of laser beam of each stage is set so as to become longer than a power average value of another irradiation time longer than the plural irradiation times.

(9) Further, the present invention provides the optical recording method, wherein in at least first stage irradiation time, the power of laser beam is set larger than a reference power until the midway time point from the irradiation start time point, and is set to the reference power until the termination time from the midway time point, and in another irradiation time longer than the irradiation time, the power of laser beam is set to the reference power until the termination time from the irradiation start time point.

(10) Further, the present invention provides the optical recording method, wherein in at least first stage irradiation time, the power of laser beam is set larger than a reference power until the termination time point from the irradiation start time point, and in another irradiation time longer than the irradiation time, the power of laser beam is set to the reference power until the termination time from the irradiation start time point.

(11) Further, the present invention provides an optical recording method, which irradiates an laser beam to an optical recording medium including a reflective layer and a recording layer, and forms a recording mark is formed on the recording layer so as to record information, comprising the following stages of:

continuously forming a virtual recording cell, each of which has an arbitrary unit length and a unit width perpendicular to the unit length in a relative moving direction to the laser beam, in the relative moving direction, with respect to the recording layer, setting five stages or more irradiation times with respect to the virtual recording cell so that the irradiation time becomes long successively from the first to final stages, setting a reference time shorter than the final stage irradiation, controlling the laser beam so that it is irradiated in all range at a power larger than a reference power in an irradiation time shorter than the reference time of the plural stage irradiation times, and is irradiated at a power larger than a reference power in an irradiation time longer than the reference time until the reference time elapsed from the irradiation start time point, and further, is irradiated at the reference power after the reference time elapsed, setting a power average value of the laser beam so as to become large in a manner that when the laser beam irradiation time is short, the irradiation time at the reference power after the reference time elapsed decreases, and a ratio of the irradiation time at the larger power increases.

(12) Further, the present invention provides the optical recording method, wherein the recording layer contains an organic dye, and is applied in the case of recording information in the recording layer.

In the above items (7) to (10), preferably, the laser beam is irradiated at a power larger than the reference power in each stage where the recording mark is formed so that a change of reflectance is less than 20% (0.2K) with respect to the optical reflectance (initial reflectance) of the optical recording medium of no-recording state. Further, in the above items (1) or (7), the "specific irradiation time" means one or plural irradiation times selected from the plural stage irradiation times.

DETAILED DESCRIPTION OF THE PREFERRED EMBODIMENTS

First, a description on the principle of the present invention is followed.

Figure 1:
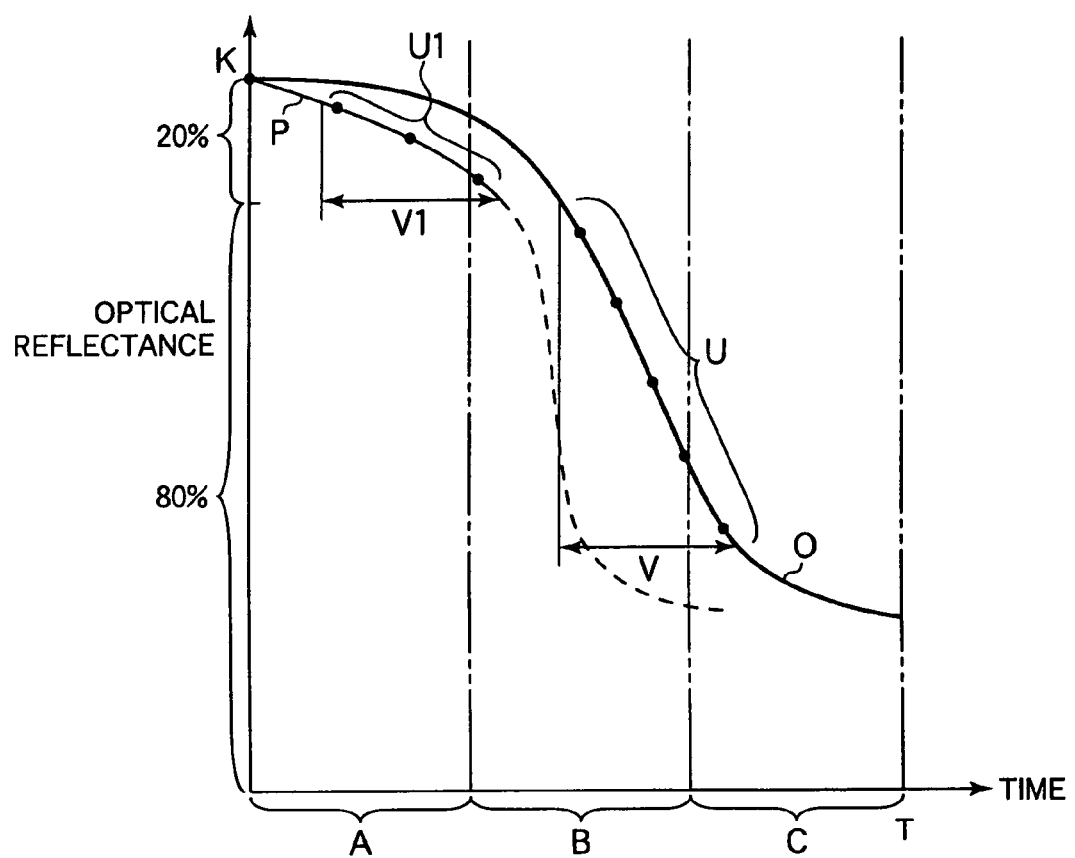
FIG. 1 is a diagram to schematically explain a relation between a change of an irradiation time of laser beam and an optical reflectance of a virtual recording cell in the present invention.

FIG. 1 shows a relation between a reduction state (shown by the solid line O) of optical reflectance of a recording mark and a time. In this case, the recording mark is formed in a virtual recording cell when a laser beam is irradiated to the virtual recording cell at a constant power over the maximum irradiation time T (maximum time usable for recording each virtual recording cell: this is called as allowable irradiation time).

As shown by the solid line O in FIG. 1, in the case where a laser beam is irradiated under the condition of constant power, an optical reflectance is not almost reduced in the initial time area A. Then, the optical reflectance is gradually reduced in an intermediate time area B, and further, its reduction speed increases as time elapses. In a termination time area C, the reduction speed gradually decreases.

The irradiation time of laser beam is preset at multiple stages, and then, the laser beam is irradiated to the virtual recording cell so as to form a recording mark (low optical reflectance area)having different size and giving different optical reflectance to the virtual recording cell; in this case, the more the number of stages of the irradiation time is, the more a recording density can be improved. However, in the case where the maximum irradiation time (i.e., allowable irradiation time) T usable for one virtual recording cell is constant, when the irradiation time is preset at multiple stages within a range of the allowable irradiation time, a "difference" between irradiation time becomes small. Forth is reason, it is difficult to accurately make the "difference" in the optical reflectance. If the difference of optical reflectance is too small, it is impossible to identify each recording mark (virtual recording cell) in reading.

Considering the above problem, in order to improve a read accuracy, the difference of optical reflectance must be securely made; therefore, it is desirable to obtain a large change of optical reflectance by a slight change of irradiation time. For example, in the solid line O, the actually usable area is an effective usable area U from the intermediate time area B to the termination time area C where the optical reflectance is securely reduced. Thus, the irradiation time is preset at multiple stages in an effective time stage range V corresponding to the above area U. This is a progressing technical concept of the present invention. In the intermediate time area B to the termination time area C, it is possible to obtain a relatively long effective time stage range V; therefore, five stages or more multi-level can be actually realized.

However, a time area from the initial time area A to the intermediate time area B (or, area where a change of optical reflectance is less than 20%) is not effectively utilized. In general, the time area is an area where it is impossible to sufficiently obtain a change of optical reflectance because a reduction speed of optical reflectance is too slow, although it is different depending upon a kind of applied recording layer (kind of dye, etc.) and a shape of groove. As a result, the difference of optical reflectance is hard to be made in the case of achieving multi-level recording at further multiple stages; for this reason, there is some limitation in the time area.

The present inventors have been interested to change a power of laser beam. More specifically, a power average (mean) value of the laser beam irradiated in an arbitrarily selected one irradiation time (in this case, means a time average) is set larger than a power average value of (arbitrary another) irradiation time longer than the above irradiation time. Namely, in the selected two irradiation times, a difference is made between their power average values, and thereby, the present inventors have succeeded in increasing the number of stages.

For example, in FIG. 1, there is shown a solid line P showing a state that a laser beam is irradiated using an average value larger than the power average value in the solid line O. By doing so, a reduction speed of optical reflectance in the initial time area A becomes faster than the solid line O, and thereby, it is possible to obtain an effective usable area U1 enabling multi-level recording. Therefore, it is possible to additionally set an irradiation time in an effective time stage range V1 (independent from V) corresponding to the area U1.

Thus, the solid lines O and P are rationally combined, and then, the laser beam is irradiated so that their power average values are different, and thereby, multi-level recording can be achieved at multiple stages by both (U, V) of the solid line O and (U1, V1) of the solid line P. Further, the number of stages thus set is increased, and thereby, it is possible to further improve a recording density of optical recording medium.

By the way, the following case is considered; more specifically, in a state that the average value is intactly kept "large" in the solid line P, multi-level recording is realized in all stages of the irradiation time including the intermediate time area B and the termination time area C. However, in this case, as shown by a dotted line elongated from the solid line P, the reduction speed of optical reflectance becomes too fast by excessive power; for this reason, it is difficult to securely stage recording with a desired reflectance.

In other words, it is no significance to simply set the power average value larger in all stages. In short, the power average value is changed by the irradiation time, and thereby, multi-level recording is realized at multiple stages.

As seen from FIG. 1, the above average value is preferable in the following manner. More specifically, the average value is set to "large" in each recording mark having a change of reflectance less than 20% (0.2K) with respect to an optical reflectance K of no-recording state. On the other hand, the average value is set to "normal" (means that is smaller than "large") in each recording mark having a change of reflectance larger than 20%.

Next, the embodiments of the present invention will be detailedly described below with reference to FIG. 2 to FIG. 10.

Figure 2:
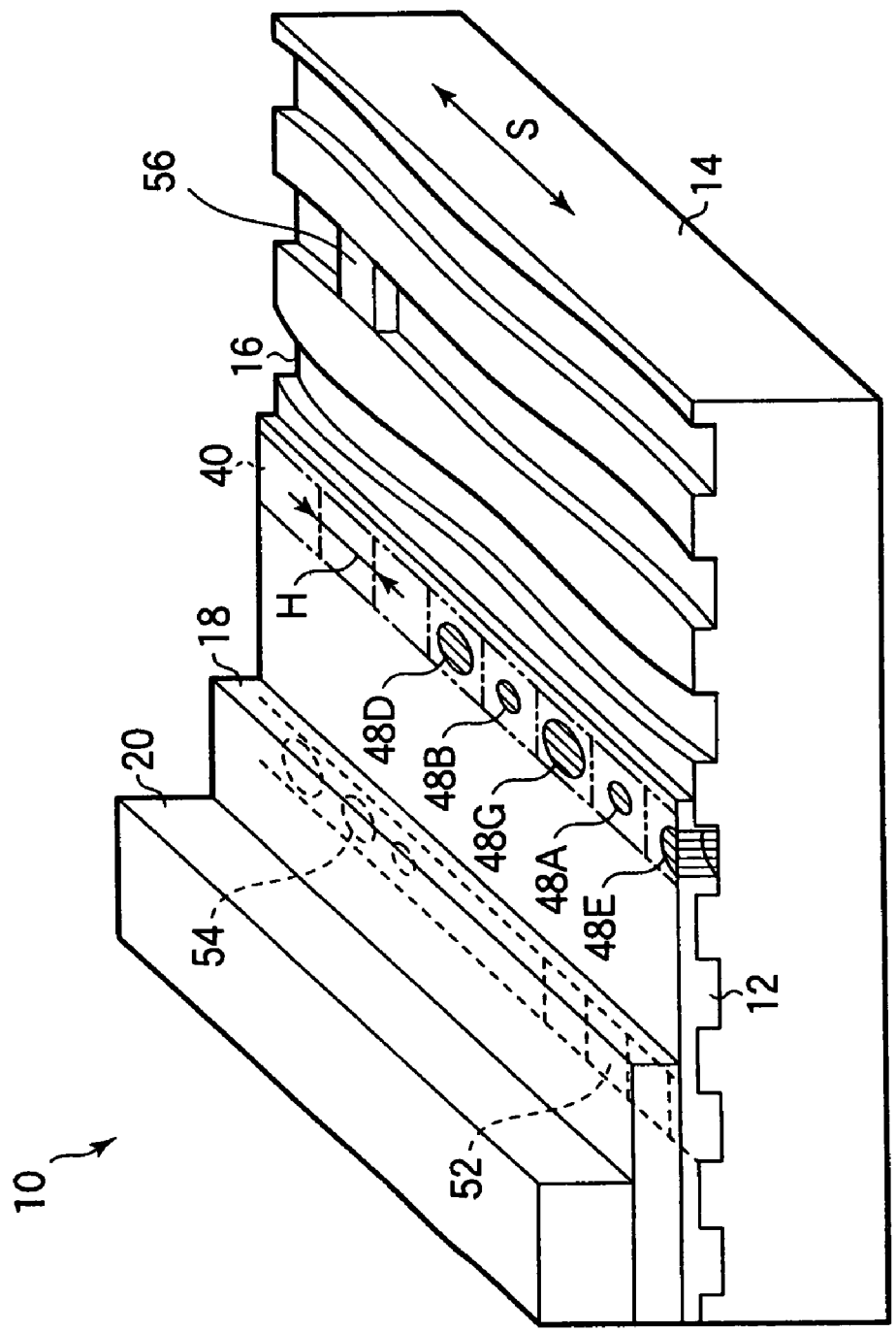
FIG. 2 is a perspective view partly in section showing principal parts of an optical recording medium to according to a first embodiment of the present invention.

In FIG. 2, there is shown an optical recording medium (disk) 10 to which the optical recording method according to the first embodiment of the present invention is applied. The optical recording medium 10 is a CD-R having a recording layer 12 using a dye, and is composed of a substrate 14 made of transparent base material, the above recording layer 12, a gold or silver reflection film (layer) 18, and a protective layer 20. More specifically, the recording layer 12 is formed out of dye applied so as to cover a laser beam guide groove 16 formed on one side (upper surface in FIG. 2) of the substrate 14. The reflection film 18 is formed on the upper side of the recording layer 12 by spattering or the like, and the protective layer 20 is formed so as to cover the reflection layer 18.

The dye used for the recording layer 12 is an organic dye including cyanine, mero-cyanine, methine-based dye and its derivative, benzenethiol metal complex, phthalocyanine dye, naphthalocyanine dye, azo dye, etc.

Figure 3:
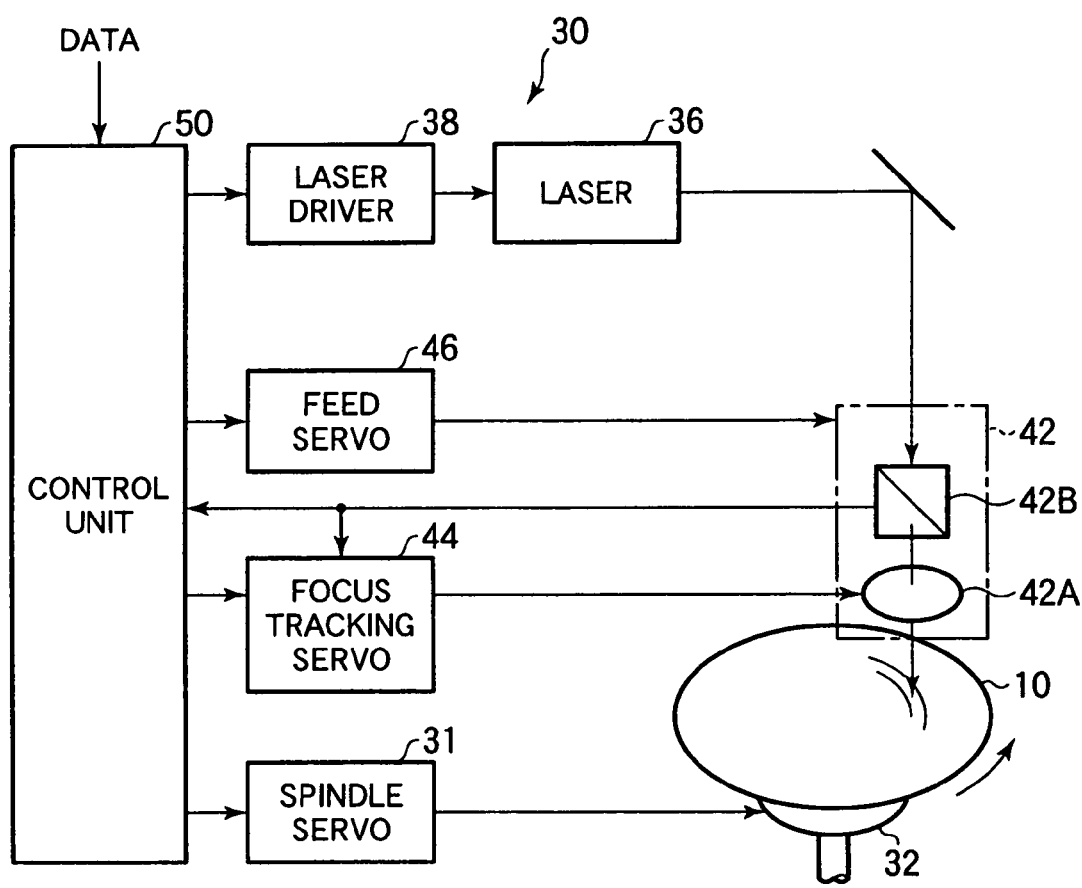
FIG. 3 is a block diagram showing an optical recording apparatus for recording information using a laser beam in order to record a data to the optical recording medium.

The optical recording method of the present invention applied to the optical recording medium 10 is carried out by using an optical recording apparatus 30 as shown in FIG. 3.

The optical recording apparatus 30 is a CD-R recorder. The optical recording apparatus 30 rotates the optical recording medium (disk) 10 by a spindle motor 32 via a spindle servo 31 under the condition of constant linear velocity, and then, records information onto the optical recording medium (disk) 10 by a laser beam irradiated from a laser 36.

In the above laser 36, in accordance with information to be recorded, a laser beam irradiation time to one of virtual recording cells (described later) 40 shown in FIG. 2 and FIG. 4, and an irradiation power are controlled by a laser driver 38. For example, the irradiation time is controlled by changing a laser pulse frequency. Further, the laser driver 38 has two power unit systems, and the first power unit and the second power unit are changed, and thereby, the irradiation power is set to two stages (high power S and reference power N).

In FIG. 3, a reference numeral 42 denotes a recording optical system including an objective lens 42A and a half-silvered mirror 42B. The objective lens 42A is controlled by a focus tracking servo 44 so that a laser beam is collected (focused) onto the recording layer 12 of the disk 10. Moreover, the objective lens 42A and the half silvered mirror 42B are controlled by a feed servo 46 so as to move at a predetermined speed from the inner peripheral side to the outer peripheral side of the disk 10 in synchronous with the rotation of the disk 10.

The above-mentioned spindle servo 31, laser driver 38, focus tracking servo 44 and feed servo 46 are controlled by a control unit 50. The data (information) to be recorded on the recording layer 12 is inputted to the control unit 50.

Subsequently, the following is a description on the virtual recording cell 40 and a recording mark recorded in the virtual recording cell 40.

As shown in FIG. 2, the virtual recording cell 40 is continuously formed along a rotational direction, that is, a circumferential direction S of the disk 10 in the groove 16. As shown in FIG. 4, a length H in the circumferential direction of each virtual recording cell 40 is set shorter than a beam diameter (diameter of beam waist) D. Then, a laser beam is irradiated for each virtual recording cell 40, and thereby, recording marks 48A to 48G as schematically shown in FIG. 4 are formed in accordance with information to be recorded.

In this case, a size (magnitude) of the recording marks 48A to 48G expresses a degree of reduction of optical reflectance in each virtual recording cell 40 including recording mark. Namely, the larger the recording marks (low optical reflectance area) shown in FIG. 4 are formed, the lower the optical reflectance of the virtual recording cell 40 is. In fact, by a kind of dye used for the recording layer 12, the size or the size and optical transmittance of these recording marks 48A to 48G is variable in accordance with a laser beam irradiation time.

Figure 4:
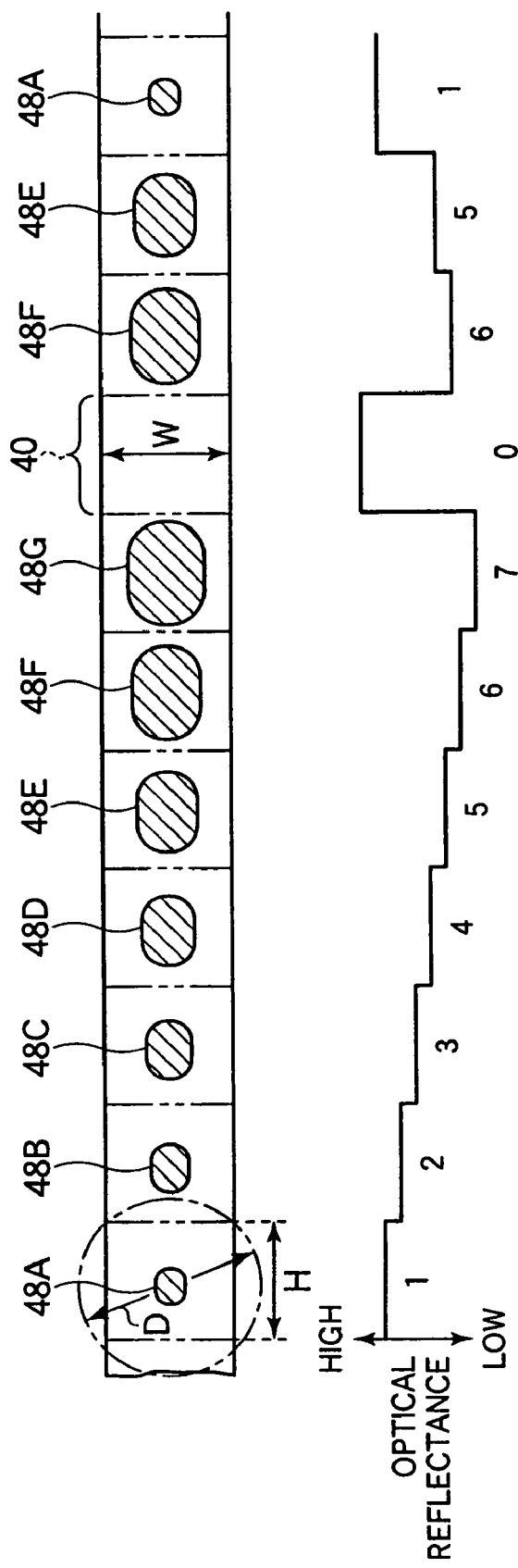
FIG. 4 is a schematic view showing a relation between a recording mark, the virtual recording cell and an optical reflectance in the case of forming the recording mark on a recording layer by the above optical recording apparatus.

By doing so, for example, it is possible to form seven-stage recording marks 48A to 48G (the reduction of optical reflectance in the virtual recording cell 40 is expressed by each size of the recording marks) as shown in FIG. 4. Further, in the case where a read laser beam is irradiated to the recording marks 48A to 48G, an optical reflectance of reflected light has in the virtual recording cell 40 seven stages.

In this case, the optical transmittance of the recording marks 48A to 48G changes. This has the same meaning such that the optical transmittance and/or refractive index of the recording layer 12 in the recording marks 48A to 48G changes. Thus, the following presumption is made. More specifically, the material forming the recording layer 12 is decomposed and modified in its quality by the laser beam irradiation, and then, the modified degree (what is called, burned degree) is different in each of the recording marks 48A to 48G. Therefore, the optical reflectance changes, and the modified portion (what is called, burned portion) is different in the thickness direction, and thereby, the optical reflectance changes.

Next, the following is a description on an optical recording method.

As already described in the optical recording medium 10, plural virtual recording cells 40 are continuously provided along the relative moving direction S so as to have an arbitrary unit length H along the relative moving direction to the laser beam and a unit width W perpendicular to the length H. In this embodiment, the optical recording medium 10 is rotating at a predetermined speed (in this case, 4.8 m/s); therefore, a continuous predetermined time (in this case, 125 ns) is arbitrarily preset in the optical recording apparatus 30, and thereby, the unit length H (0.6 μm=4.8 m/s×125 ns) of the virtual recording cell 40 is determined.

Incidentally, the unit width W of the virtual recording cell 40 is determined as the width of the groove 16; in this case, the width other than above may be determined.

Figure 5:
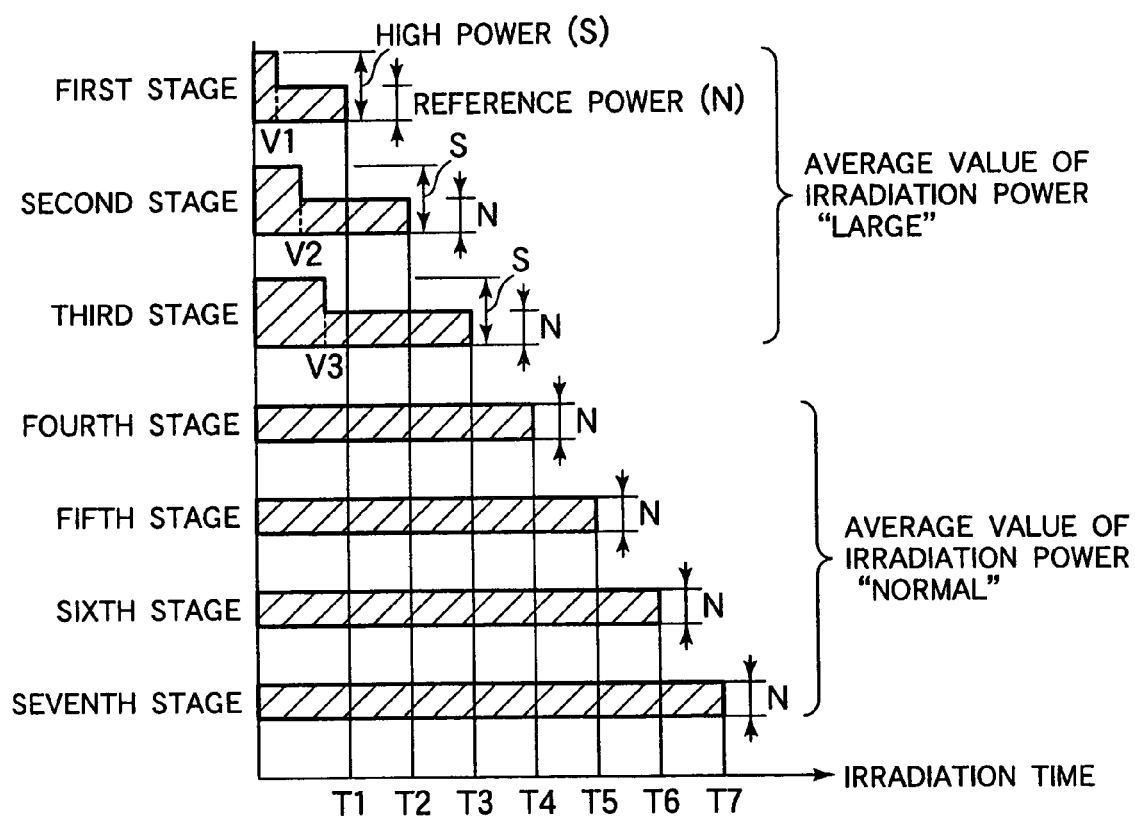
FIG. 5 is a time chart showing a power stage state of laser beam irradiated to the optical recording medium according to the first embodiment of the present invention.

Moreover, as shown in FIG. 5, five stages or more irradiation times (seven stages in this embodiment) are preset with respect to the virtual recording cell 40. In this case, the stage of irradiation time includes the first stage to the final stage, which successively become long.

In this case, in the irradiation times T1, T2 and T3 from the first to third stages (although there is no problem in the first stage at least), the laser beam is set to a high power S larger than the reference power N until the midway time points Y1, Y2 and Y3 from the irradiation start. Thereafter, the laser beam is set to the reference power N until the termination time from the midway time points Y1, Y2 and Y3. Therefore, for example, an average value Pw of power irradiated in the first stage is obtained from the following equation $\{S \times Y1 + N \times (T1-Y1)\}/T1$. Further, the second and third stage irradiation times are obtained in the same manner as above. In this case, the midway time points Y1 to Y3 are different in each stage; however, of course, the first to third stage the midway time points may be set to the same time point.

In the fourth to seventh stages irradiation times T4 to T7 longer than the third stage irradiation time T3, the laser beam is set to the reference power N from the irradiation start time to the termination time. Therefore, each average value Pw of power irradiated in the fourth to seventh stages is all reference power N.

As a result, the power average value Pw of laser beam in a specific irradiation time (any) of seven stage irradiation times is set so as to become larger than the average value Pw (N) in another irradiation time longer than the specific irradiation time. In this case, as the specific irradiation time, one may be arbitrarily selected from the first to third stage irradiation times; on the other hand, as another irradiation time, any of the fourth to seventh stage irradiation times T4 to T7 may be selected.

Likewise, the plurality of irradiation times T1 to T3 from the first to third stages is considered as a set. Thus, in the plurality of irradiation times T1 to T3, a power average value Pw of laser beam in each stage is set so as to become larger than a power average value Pw (N) in another irradiation time longer than these irradiation times. In this case, as another irradiation time, one maybe arbitrarily selected from the fourth to seventh stage irradiation times T4 to T7.

Under the power condition shown in FIG. 5, a laser beam is irradiated to the virtual recording cell 40, and thereby, the virtual recording cell 40 is formed with recording marks 48A to 48G having seven stage different optical reflectance.

Figure 6:
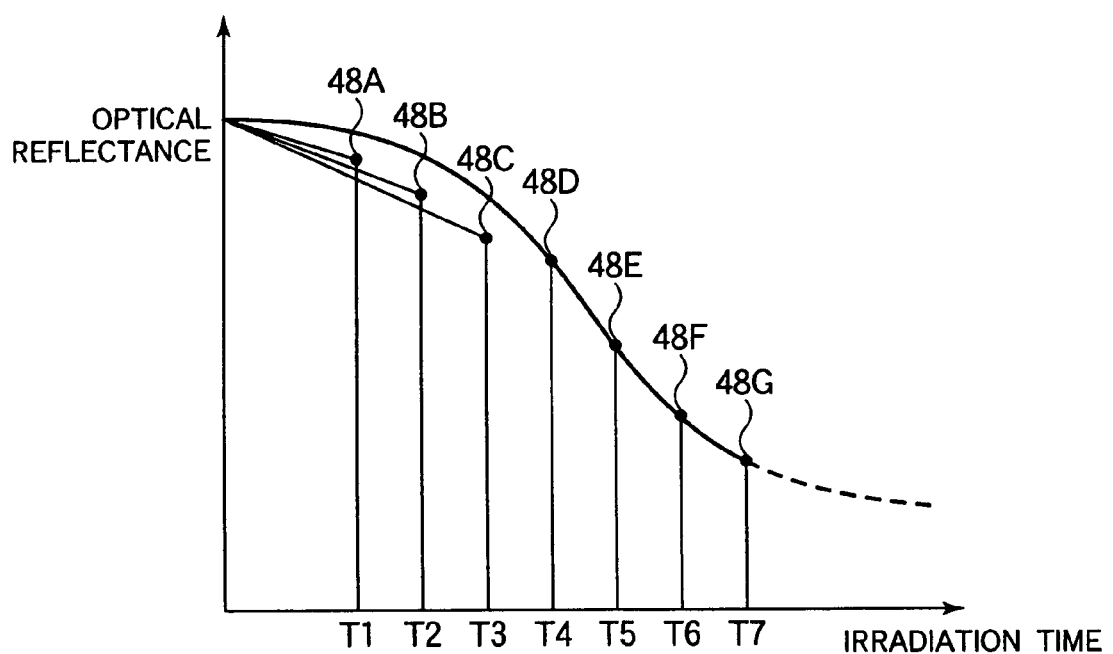
FIG. 6 is a diagram showing a state that an optical reflectance of the virtual recording cell is reduced by each recording mark in the optical recording medium.

FIG. 6 shows a relation between seven stage irradiation times T1 to T7 and a reduction of optical reflectance of the virtual recording cell 40 by the recording marks 48A to 48G formed by these irradiation times in this recording method.

In the first to third stage irradiation times T1 to T3, their power average values of laser beam are larger than those after the fourth stage irradiation time; therefore, the optical reflectance is reduced soon, and a desired reduction is obtained for a short time. On the other hand, in the fourth to seventh stage irradiation times T4 to T7, write is carried out in an area where a reduction speed of optical reflectance is properly stable.

As described above, in the optical recording medium and method according to the first embodiment, the power average value of laser beam is properly controlled by the irradiation time. Therefore, the recording marks 48a to 48C can be formed at multiple stages in a short irradiation time area (first to third stage irradiation times in this embodiment) where it has been considered to be impossible in a process of development). As a result, it is possible to further increase the number of stages, and to improve a recording density. Further, in the case where the irradiation time is long, the power average value is set smaller than the case where the irradiation time is short; therefore, it is possible to keep a state that the optical reflectance of the virtual recording cell is properly reduced for a long time. As a result, the recording marks 48D to 48G can be securely formed over the multiple stages from the fourth to the seventh stages.

By the way, the recording power is set to two stages so as to become a high power S in irradiation start in the first to third stages. It is not a principal object to sharpen a mark edge of the recording mark. Because, according to the optical recording method, the recording mark is securely recorded in the virtual recording cell, and then, the number of stages is recognized by a change of optical reflectance of the virtual recording cell, and thus, multi-level recording can be achieved.

More specifically, like the conventional binary recording, in a situation such that a "length" of the recording mark must be recognized, there is a need of securely judge the start time point of the recording mark. In the light of the above situation, the rise (mark edge) of the recording mark must be sharpened; for this reason, the power of laser beam has been controlled so as to become large to some degree. However, in this embodiment, in order to realize further multiple stage recording, the power of laser beam is changed over as a principal object for controlling a change speed of optical reflectance.

In this embodiment, the power of laser beam is changed into two stages (reference power N and high power S), and thereby, the power average value has been changed. Under the same concept as above, the power of laser beam is changed into three stages or more, and thereby, the power average value may be changed. Further, the power average value has been set to "large" from the first to third stages, and is set to "normal" from the fourth to seventh stages. The present invention is not limited to the above embodiment, and the difference is made in a manner that in arbitrarily selected two different irradiation times, a shorter irradiation time has the "large" average value; on the other hand, a longer irradiation time has the "normal" average value. Therefore, so long as the above difference is made, the technical concept belongs to the scope of the present invention (even if the above situation is not established in the case of selecting two other irradiation times).

Next, the following is a description on optical recording medium and method according to the second embodiment of the present invention. In this case, the optical recording medium and apparatus has the same basic structure as the optical recording medium 10 and the optical recording apparatus 30 described in the above first embodiment. Therefore, like reference numerals are used to designate the same components and members, and the explanation and illustration of these components or the like are omitted.

In the optical recording medium 10 and the optical recording method of this second embodiment, the virtual recording cell 40 is continuously provided along the relative moving direction S so as to have an arbitrary unit length H along the relative moving direction to the laser beam and a unit width W perpendicular to the length H. In this case, in the same manner as the above first embodiment, the optical recording medium 10 is rotating at a predetermined speed (in this case, 4.8 m/s). Therefore, a continuous predetermined time (in this case, 125 ns) is arbitrarily preset in the optical recording apparatus 30, and thereby, the unit length H (0.6 μm=4.8 m/s×125 ns) of the virtual recording cell 40 is determined.

Figure 7:
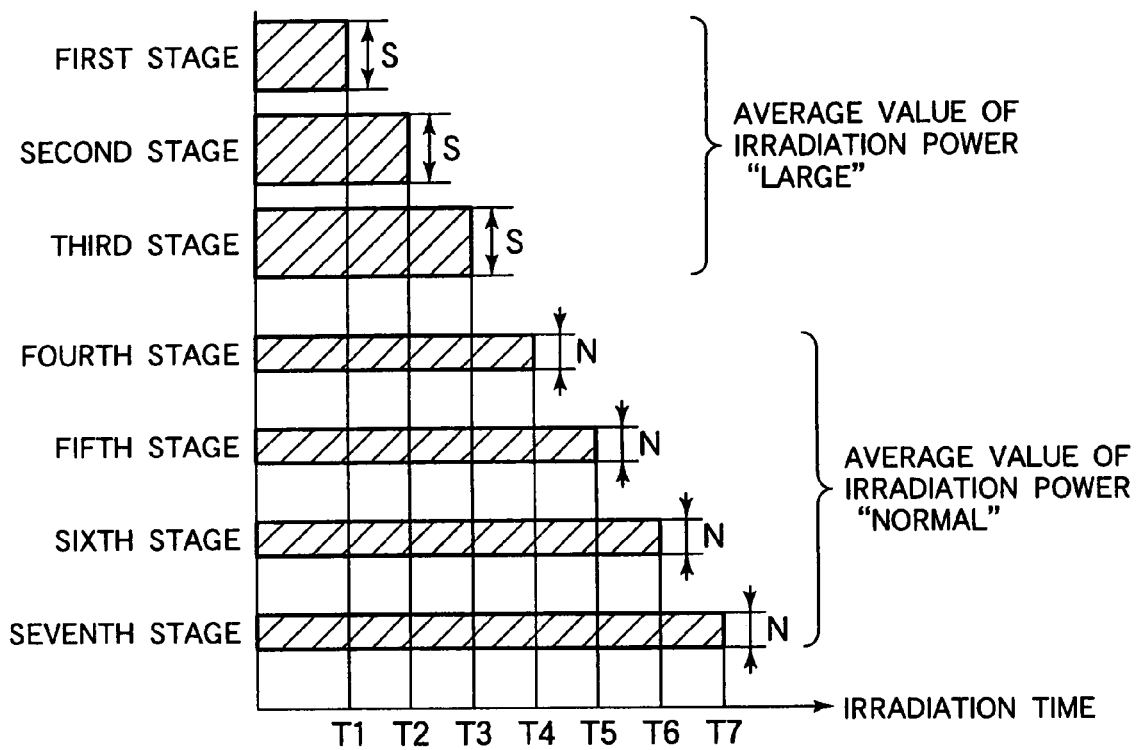
FIG. 7 is a time chart showing a power stage state of laser beam irradiated to the optical recording medium according to a second embodiment of the present invention.

Moreover, as shown in FIG. 7, five (5) stages or more irradiation times (seven stages in this embodiment) are preset with respect to the virtual recording cell 40. In this case, the stage of irradiation time includes the first stage to the final stage, which successively become long.

In this case, in the irradiation times T1, T2 and T3 from the first to third stages (although there is no problem in the first stage at least), the laser beam is set to a high power S larger than the reference power N until the termination time point from the irradiation start point.

Further, in the fourth to seventh stage irradiation times T4 to T7 longer than the third stage irradiation time T3, the laser beam is set to the reference power N from the irradiation start time to the termination time. Therefore, each average value Pw of power irradiated in the first to third stages is all high power S; on the other hand, each average value Pw of power irradiated in the fourth to seventh stages is all reference power N.

As a result, the power average value Pw (S) of laser beam in a specific irradiation time (any) of seven stage irradiation times is set so as to become larger than the average value Pw (N) in another irradiation time longer than the specific irradiation time. In this case, the specific irradiation time corresponds to any of the first to third stage irradiation times; on the other hand, another irradiation time may be any of the fourth to seventh stage irradiation times T4 to T7.

Likewise, the plurality of irradiation times T1 to T3 from the first to third stages (by at least second stages in the present invention) is considered as a set. Thus, in the plurality of irradiation times T1 to T3, a power average value Pw (S) of laser beam in each stage is set so as to become larger than a power average value Pw (N) in another irradiation time longer than these irradiation times. In this case, as another irradiation time, any of the fourth to seventh stage irradiation times T4 to T7 may be arbitrarily selected.

Under the power condition shown in FIG. 7, a laser beam is irradiated to the virtual recording cell 40, and thereby, the virtual recording cell 40 is formed with recording marks 48A to 48G which bring seven stage different optical reflectance to the virtual recording cell 40.

In this second embodiment, it is possible to obtain the quite same effect as the above first embodiment. Further, like the first embodiment, there is no need of carrying out a control for changing the power of laser beam using the midway time points Y1, Y2 and Y3; therefore, it is possible to readily realize multi-level recording. In this case, the power of laser beam may be changed into three stages; for example, the power of laser beam may be set so as to successively becomes weak in the first to seventh stages.

Next, the following is a description on optical recording medium and method according to the third embodiment of the present invention. In this case, the optical recording medium and apparatus has the same basic structure as the optical recording medium 10 and the optical recording apparatus 30 described in the above first embodiment. Therefore, like reference numerals are used to designate the same components and members, and the explanation and illustration of these components or the like are omitted.

In the optical recording medium 10 and the optical recording method of this third embodiment, plural virtual recording cells 40 are continuously provided along the relative moving direction S so as to have an arbitrary unit length H along the relative moving direction to the laser beam and a unit width W perpendicular to the length H.

Figure 8:
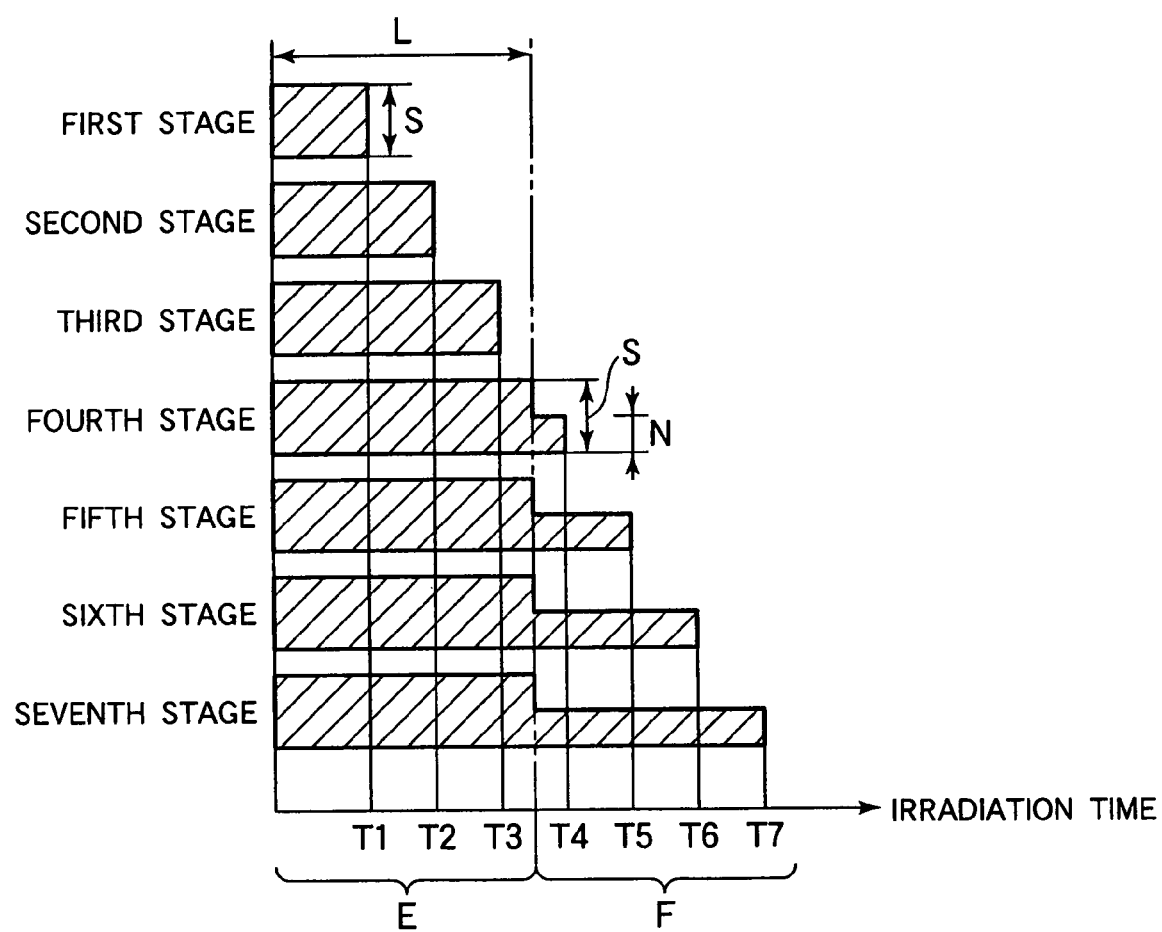
FIG. 8 is a time chart showing a power stage state of laser beam irradiated to the optical recording medium according to a third embodiment of the present invention.

Moreover, as shown in FIG. 8, five stages or more irradiation times (seven stages in this embodiment) are preset with respect to the virtual recording cell 40. In this case, the stage of irradiation time includes the first stage to the final stage, which successively become long.

Further, a reference time L is set so as to become shorter than the seventh stage irradiation time T7, which is the final stage. More specifically, in this third embodiment, the reference time L is set so as to become longer than the third stage irradiation time T3 and to become shorter than the fourth stage irradiation time T4.

Of all stage irradiation times T1 to T7, in the irradiation times (T1 to T3 in this case) shorter than the reference time L, the laser beam is irradiated over all range at the high power S larger than the reference power N. On the other hand, in the irradiation times (T4 to T7 in this case) longer than the reference time L, the laser beam is irradiated at the high power S (larger than the reference power N) until the reference time L elapsed from the irradiation start time point. Then, after the reference time L elapsed, the laser beam is irradiated at the reference power. Namely, the time until the reference time L elapsed from the irradiation start is determined as a strong irradiation interval E, on the other hand, the time after the reference time L elapsed is determined as a normal irradiation interval F.

By doing so, when the irradiation times T1 to T7 of laser beam are short, the irradiation time at the reference power N (i.e., irradiation time in the normal irradiation interval F) after the reference time L elapsed decreases. On the other hand, the irradiation time (i.e., irradiation time in the strong irradiation interval E) at the high power S increases. As a result, the shorter the irradiation times T1 to T7 are, the larger the power average value of laser beam becomes.

For example, a power average value Pw7 in the seventh stage irradiation is obtained from the following equation.

$$Pw7=\{S{\times}L+N{\times}(T7-L)\}/T7$$

Further, a power average value Pw4 in the fourth stage irradiation is obtained from the following equation.

$$Pw4=\{S{\times}L+N{\times}(T4-L)\}/T4$$

In this case, in the above equations, L is constant, and the relations of S>N and T4<T7 are formed; therefore, the relation of Pw4>Pw7 is formed. Thus, it can be seen that when the irradiation time is short, the average value becomes large. In the first to third stages, the irradiation time of the normal irradiation interval F becomes zero, and the power average value is S.

Figure 9:
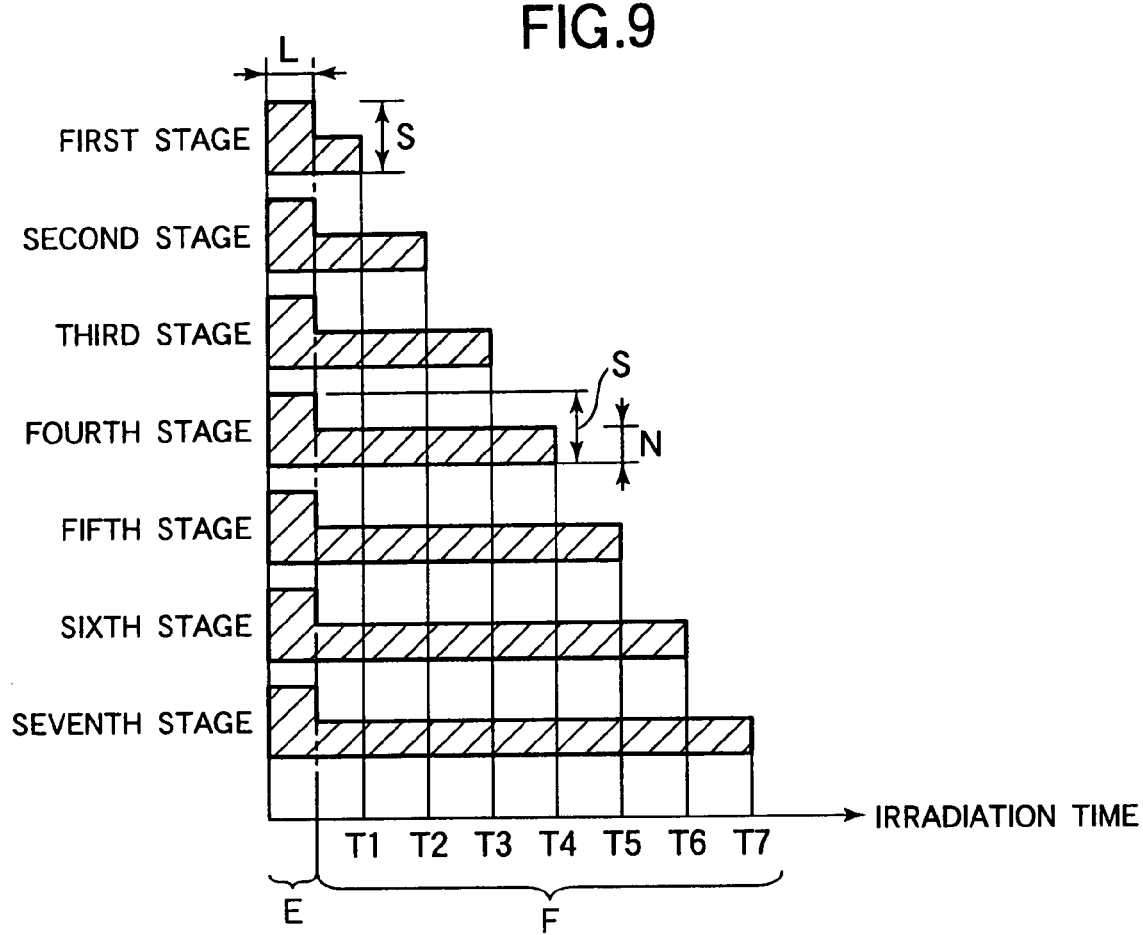
FIG. 9 is a time chart showing a power stage state of laser beam irradiated to the optical recording medium according to another example of the third embodiment of the present invention.

In an optical recording medium 10 of the third embodiment and the recording method, the same effect as the above first and second embodiments can be obtained. The power is set to two stages (S, N); nevertheless, it is possible to stepwise change the power average value by a ratio of irradiation time. Incidentally, the reference time L is set between the third stages irradiation time T3 and the fourth stage irradiation time T4. In this case, the reference time L may be set anywhere so long as it is set within a range of the maximum irradiation time. For example, as shown in FIG. 9, the reference time L may be set to a time shorter than the first stage irradiation time T1.

As described in the first to third embodiments, the optical recording medium and the optical recording method are adaptable to the case where the recording layer 12 of the optical recording medium 10 contains an organic dye component. In this case, of course, the present invention may be applicable to other recording layers containing no organic dye component, for example, recording layers formed of inorganic dye and other materials.

The above embodiments have described the case where the above optical recording medium 10 is a CD-R disk. The optical recording medium of the present invention is not limited to the above CD-R disk, and is widely applicable to other optical recording medium. In addition, the optical recording medium of the present invention is not limited to the disk-like rotating element.

Further, the size of the virtual recording cell 40 set when forming the recording mark by the optical recording apparatus 30 is not limited to the above embodiment. In particular, it is preferable that the length of the virtual recording cell 40 is set so as to become equal to the width of the groove 16 so long as the beam waist diameter of laser beam is further made small. On the other hand, in the case of recording the recording mark at multiple stages such as five stages, the length of the virtual recording cell 40 may be set larger than the laser beam waist. In this case, part of the recording marks can be made into a size more than the beam waist.

Figure 10:
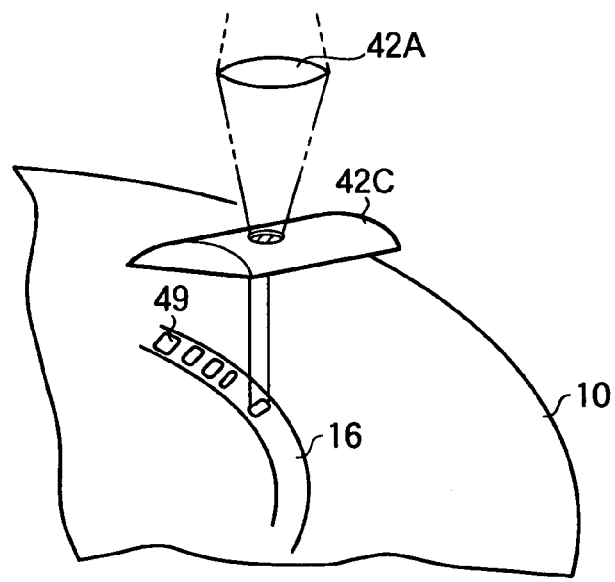
FIG. 10 is a schematically perspective view showing the case where the laser beam irradiated to the virtual recording cell has another shape.

Moreover, the recording laser beam has a circular shape in the recording layer 12. As shown in FIG. 10, however, this can utilize, for example, a beam shaping prism 42C in addition to the objective lens 42A and the beam shape may be formed into an elliptic or linear shape as shown in FIG. 10, which is short in the feed direction of the optical recording medium 10, and is long in the direction perpendicular to the feed direction. In this case, a recording mark 49 becomes short, so that the virtual recording cell can be further shortened. In other words, it is possible to improve a recording density.

Further, the optical recording medium of this embodiment may be constructed so as to previously have a plurality of pits as shown by a reference numeral 52 in FIG. 2, which have the number of different reflectance corresponding to the signal modulation stages of the optical recording medium 10. The following specific information may be recorded in the plurality of pits 52. More specifically, the information includes information for individually identifying the optical recording medium 10, information for identifying whether a recording medium is an optical recording medium for multi-level recording, power information of laser beam for recording and reading the recording medium, etc. The following case is a concept included in the scope of the present invention. Namely, specific information is read in the optical recording medium 10 in recording, and then, according to the recorded information, the reference power is set so as to achieve optical recording.

Besides, by the above specific information, it is possible to securely identify whether a recording medium is an optical recording medium for multi-level recording, and to determine an irradiation time of laser beam in accordance with the number of stages of pit previously recorded. Therefore, multi-level recording and reading can be further securely carried out.

As shown by a reference numeral 56 in FIG. 2, the laser beam guide groove is provided with a groove partition, which partially partitions the groove, and thereby, the same effect as above can be obtained. The groove partition may be usable solely or may be combined.

As is evident from the above description, according to the present invention, it is possible to provide an optical recording medium having recording marks formed at multiple stages, and to greatly improve an information recording density.

What is claimed is:

1. An optical multi-level recording medium, including a reflective layer and a recording layer, and constructed in a manner that a recording mark is formed on the recording layer by irradiating a laser beam so as to record information,
   plural virtual recording cells being continuously formed in a relative moving direction to the laser beamon the recording layer, each of which has an arbitrary unit length and a unit width perpendicular to the unit length in the relative moving direction,
   five stages or more irradiation times being set with respect to the virtual recording cell so that the irradiation time becomes long successively from the first to final stages,
   a power average value of laser beam in a specific irradiation time of the plural-stage irradiation times being set so as to become larger than a power average value of another irradiation time longer than the specific irradiation time, and
   recording marks being formed in the virtual recording cell and giving five stages or more different optical reflectance to the virtual recording cell when the laser beam is irradiated to the virtual recording cell.

2. The optical recording medium according to claim 1, wherein in the plural irradiation times from the first stage to at least second stage, a power average value of laser beam of each stage is set so as to become longer than a power average value of another irradiation time longer than the plural irradiation times.

3. The optical recording medium according to claim 2, wherein in at least first stage irradiation time, the power of laser beam is set larger than a reference power until the midway time point from the irradiation start time point, and is set to the reference power until the termination time from the midway time point, and
   in another irradiation time longer than the irradiation time, the power of laser beam is set to the reference power until the termination time from the irradiation start time point.

4. The optical recording medium according to claim 2, wherein in at least first stage irradiation time, the power of laser beam is set larger than a reference power until the termination time point from the irradiation start time point, and
   in another irradiation time longer than the irradiation time, the power of laser beam is set to the reference power until the termination time from the irradiation start time point.

5. The optical recording medium according to claim 1, wherein in at least first stage irradiation time, the power of laser beam is set larger than a reference power until the midway time point from the irradiation start time point, and is set to the reference power until the termination time from the midway time point, and
   in another irradiation time longer than the irradiation time, the power of laser beam is set to the reference power until the termination time from the irradiation start time point.

6. The optical recording medium according to claim 1, wherein in at least first stage irradiation time, the power of laser beam is set larger than a reference power until the termination time point from the irradiation start time point, and
   in another irradiation time longer than the irradiation time, the power of laser beam is set to the reference power until the termination time from the irradiation start time point.

7. The optical recording medium according to claim 1, wherein the recording layer contains an organic dye.

8. The optical recording medium according to claim 7, wherein the recording layer contains an organic dye.

9. An optical recording method, which irradiates an laser beam to an optical recording medium including a reflective layer and a recording layer, and forms a recording mark is formed on the recording layer so as to record information, comprising the following stages:

continuously forming plural virtual recording cells, each of which has an arbitrary unit length and a unit width perpendicular to the unit length in a relative moving direction to the laser beam, in the relative moving direction, with respect to the recording layer;

setting five stages or more irradiation times with respect to the virtual recording cell so that the irradiation time becomes long successively from the first to final stages;

setting a power average value of laser beam in a specific irradiation time of the plural-stage irradiation times so as to become larger than a power average value of anther irradiation time longer than the specific irradiation time; and forming recording marks being formed in the virtual recording cell and giving five stages or more different optical reflectance to the virtual recording cell when the laser beam is irradiated to the virtual recording cell.

10. The optical recording method according to claim 9, wherein in the plural irradiation times from the first stage to at least second stage, a power average value of laser beam of each stage is set so as to become longer than a power average value of another irradiation time longer than the plural irradiation times.

11. The optical recording method according to claim 9, wherein in at least first stage irradiation time, the power of laser beam is set larger than a reference power until the midway time point from the irradiation start time point, and is set to the reference power until the termination time from the midway time point, and in another irradiation time longer than the irradiation time, the power of laser beam is set to the reference power until the termination time from the irradiation start time point.

12. The optical recording method according to claim 9, wherein in at least first stage irradiation time, the power of laser beam is set larger than a reference power until the termination time point from the irradiation start time point, and in another irradiation time longer than the irradiation time, the power of laser beam is set to the reference power until the termination time from the irradiation start time point.

13. The optical recording method according to claim 9, wherein the laser beam is irradiated at a power larger than the reference power in each stage where the recording mark is formed so that a change of reflectance is less than 20% (0.2K) with respect to the initial optical reflectance of the optical recording medium of no-recording state.

14. The optical recording method according to claim 13, wherein the recording layer contains an organic dye, and is applied in the case of recording information in the recording layer.

* * * * *